US010360095B2

(12) United States Patent
Hives et al.

(10) Patent No.: US 10,360,095 B2
(45) Date of Patent: Jul. 23, 2019

(54) METHODS AND APPARATUSES FOR IMPROVING FAILURE RECOVERY IN A DISTRIBUTED SYSTEM

(71) Applicant: Change Healthcare Holdings, LLC, Nashville, TN (US)

(72) Inventors: Albert Hives, Oakland, CA (US); Dominique Plante, Martinez, CA (US); Alex Koshta, San Francisco, CA (US); Evan Schnell, North Oaks, MN (US); Divya Kosaraju, Dublin, CA (US); Jordan Liu, Castro Valley, CA (US); Sherry Bath, San Ramon, CA (US); John D. Schiffer, San Francisco, CA (US); Anthony Costello, Union City, CA (US)

(73) Assignee: CHANGE HEALTHCARE HOLDINGS, LLC, Nashville, TN (US)

( * ) Notice: Subject to any disclaimer, the term of this patent is extended or adjusted under 35 U.S.C. 154(b) by 54 days.

(21) Appl. No.: 15/086,526

(22) Filed: Mar. 31, 2016

(65) Prior Publication Data
US 2017/0286208 A1  Oct. 5, 2017

(51) Int. Cl.
*G06F 11/07* (2006.01)

(52) U.S. Cl.
CPC ...... *G06F 11/0793* (2013.01); *G06F 11/0709* (2013.01); *G06F 11/079* (2013.01); *G06F 11/0751* (2013.01); *G06F 11/0772* (2013.01)

(58) Field of Classification Search
CPC ............ G06F 11/1402; G06F 11/1438; G06F 11/3006; G06F 11/3612; G06F 11/079; G06F 11/1629; G06F 11/1658; G06F 11/2023; G06F 11/2268; G06F 11/362; G06F 11/3692
See application file for complete search history.

(56) References Cited

U.S. PATENT DOCUMENTS

| | | | | |
|---|---|---|---|---|
| 7,711,825 B2 * | 5/2010 | Lamport | ............... | G06F 11/182 709/203 |
| 7,779,298 B2 * | 8/2010 | Challenger | ......... | G06F 11/1438 714/13 |
| 8,589,574 B1 * | 11/2013 | Cormie | ............. | G06F 17/30094 709/230 |
| 8,631,276 B2 * | 1/2014 | Varadarajan | ........ | G06F 11/1438 714/15 |
| 9,092,561 B2 * | 7/2015 | Miao | ................... | G06F 11/3612 |
| 2008/0307258 A1 * | 12/2008 | Challenger | ......... | G06F 11/1438 714/20 |

(Continued)

*Primary Examiner* — Nadeem Iqbal
(74) *Attorney, Agent, or Firm* — Alston & Bird LLP

(57) ABSTRACT

Embodiments are disclosed for improving failure recovery in a distributed system during execution of a processing chain. In the context of a method, an example embodiment includes implementing, by the distributed system, a task coordination state machine corresponding to the processing chain. This example embodiment of the method further includes discovering, using the task coordination state machine, an error occurring during execution of the processing chain. Finally, the example embodiment of the method further includes reporting the error by a failure report generator service and recovering, by a failure recovery service, from the error. Corresponding apparatuses and computer program products are also provided.

20 Claims, 19 Drawing Sheets

(56) References Cited

U.S. PATENT DOCUMENTS

| | | | | |
|---|---|---|---|---|
| 2010/0125758 A1* | 5/2010 | Yang | ................... | G06F 11/362 |
| | | | | 714/45 |
| 2014/0304398 A1* | 10/2014 | Carlen | ................... | H04L 65/80 |
| | | | | 709/224 |
| 2017/0212799 A1* | 7/2017 | Konireddygari | .... | G06F 11/0793 |

* cited by examiner

METHODS AND APPARATUSES FOR IMPROVING FAILURE RECOVERY IN A DISTRIBUTED SYSTEM

TECHNOLOGICAL FIELD

Example embodiments of the present invention relate generally to distributed computing and, more particularly, to methods and apparatuses for improving the failure recovery capabilities of a distributed system.

BACKGROUND

In distributed systems, it is extremely difficult to discover failures and recover from them. These systems typically log errors by capturing a stack trace and recording it to a file or data source. However, because most distributed systems lack task coordination, recovery is even trickier. In fact, without such coordination, when a failure does occur such systems cannot recover from the point at which the failure occurred in the workflow. Instead, failure recovery typically necessitates retrying the processing chain, which can be expensive depending on how much processing power is required.

FIGS. 1A-1C illustrate an example of this problem. In FIG. 1A, a processing chain is shown for execution by a distributed system. The processing chain has three units of work (A, B, and C) that need to be executed in sequence. FIG. 1B illustrates that when there is a failure while trying to transition from unit B to unit C, the contact points between units B and C in FIG. 1B are severed. The system modeled in FIG. 1A does not have a way to transition between units of work when a failure severs the processing chain. To advance from unit B to unit C in this system thus requires the expenditure of engineering resources to deduce the following information: (1) what processing occurs in unit C to determine the proper way to reposition the system such that unit C can run properly; and (2) what data is necessary coming out of unit C to put the system in its proper state thereafter.

Many distributed systems track their states implicitly by generating log or configuration files. In most cases, the information contained in such files is not actionable by the system during recover, and accessing this information would require the use of engineering resources to write additional executable code to do so. Even then, however, effectively utilizing this information requires the use of auditing, and auditing from inside this executable code lacks the richness of going through the normal processing chain. In this regard, reliance on executable code to access the information contained in these log or configuration files is extremely error prone, because this executable code usually does not record enough information to safely reposition the system based on this information, which in turn places a heavy reliance on the ability of engineers to understand the internal makeup of the system and stage data appropriately. Not only that, but this model requires several people working in unison upstream to deploy and verify each fix with customers. Recovering from failures can be a very tedious and costly process given that there may be multiple customers, multiple instances of failure, and multiple failure points within a given distributed system. Accordingly, FIG. 1C represents what recovery looks like in distributed systems that do not employ the concept of task coordination.

Due to this heavy reliance on manual effort for recovering from failures in this fashion, tracking of changes is usually sparse to non-existent. Thus, this traditional approach exposes an organization to the potential of violating Federal and/or State statutory or regulatory requirements regarding data integrity, such as those imposed by the Health Insurance Portability and Accountability Act of 1996 (HIPAA). Ad hoc approaches of this nature also expose the system to downstream issues because the data has not passed through normal processing points. Finally, these types of systems do not have a way to deliver actionable information to the user that may facilitate debugging. Finally, failure recovery of this nature does not empower users to recover from incidents unilaterally, and instead requires users to interface with customer support and/or other representatives of the organization managing the distributed system.

BRIEF SUMMARY

Example embodiments described herein address at least the above deficiencies and provide methods and apparatuses that enable distributed processing systems to reliably recover from failures. To accomplish this goal, example embodiments implement task coordination within the distributed system by binding various units of work together with a state machine. While the units of work do not directly interact with one another, use of a state machine to bind the units of work together ensures that the processing chain itself is stateful and enables the processing chain to effectively recover from failures.

In a first example embodiment, a method is provided for improving failure recovery in a distributed system during execution of a processing chain. The method includes implementing, by the distributed system, a task coordination state machine corresponding to the processing chain, and discovering, using the task coordination state machine, an error occurring during execution of the processing chain. The method further includes reporting the error by a failure report generator service, and recovering, by a failure recovery service, from the error.

In some embodiments, the task coordination state machine comprises a set of states, wherein the set of states includes the error state and a state corresponding to each unit of work in the processing chain, a set of state transitions, each of which illustrates a logical connections between two states in the set of states, and a set of events defining changes in a context of the processing chain that correspond to each state transition.

In some embodiments, discovering the error using the task coordination state machine includes, in response to occurrence of the error, transitioning the task coordination state machine from a particular working state into an error state, and generating a notification based on the error. In some such embodiments, the notification identifies a reason code, a time stamp, a type of the error, a severity of the error, and a criticality of the error.

In some embodiments, reporting the error by the failure report generator service includes generating an incident based on a notification generated during discovery of the error, wherein the generated incident identifies an incident context and one or more reason codes describing one or more failures that caused the error, storing the incident in an incident repository, and notifying applications affected by the incident. In some such embodiments, reporting the error by the failure report generator service further includes causing presentation, by a user device, of the incident, wherein the presentation includes a reason code associated with the incident, a summary of the incident, and information regarding how to recover from the incident, and awaiting instructions, from the user device, to initiate a failure recovery service to recover from the incident. Additionally or alternatively, the incident may further identify a correlation identifier that can be used to stitch together events in the system, and wherein the incident context identifies. at least one of a source unit of work, a target unit of work, and an initiating system or user that initiated processing that caused the error.

In some embodiments, recovering, by the failure recovery service, from the error includes calling, by the failure recovery service, a resolution plan selector for selection of one or more resolvers to recover from the error, retrieving, by the resolution plan selector, one or more resolvers responsive to one or more reason codes identified by an incident associated with the error, executing, by a resolution plan executor, the one or more resolvers to rehydrate a context of a particular working state of the task coordination state machine that was in effect prior to occurrence of the error, and transitioning, by the distributed system, the task coordination state machine to the particular working state.

In another example embodiment, an apparatus is provided for improving failure recovery in a distributed system during execution of a processing chain. The apparatus includes at least one processor and at least one memory storing computer-executable instructions, that, when executed by the at least one processor, cause the apparatus to implement a task coordination state machine corresponding to the processing chain, discovering, using the task coordination state machine, an error occurring during execution of the processing chain, report the error, and recover from the error.

In some embodiments, the task coordination state machine comprises a set of states, wherein the set of states includes the error state and a state corresponding to each unit of work in the processing chain, a set of state transitions, each of which illustrates a logical connections between two states in the set of states, and a set of events defining changes in a context of the processing chain that correspond to each state transition.

In some embodiments, the computer-executable instructions, when executed by the at least one processor, cause the apparatus to discover the error using the task coordination state machine by causing the apparatus to, in response to occurrence of the error, transition the task coordination state machine from a particular working state into an error state, and generate a notification based on the error. In some such embodiments, the notification identifies a reason code, a time stamp, a type of the error, a severity of the error, and a criticality of the error.

In some embodiments, the computer-executable instructions, when executed by the at least one processor, cause the apparatus to report the error by causing the apparatus to generate an incident based on a notification generated during discovery of the error, wherein the generated incident identifies an incident context and one or more reason codes describing one or more failures that caused the error, store the incident in an incident repository, and notify applications affected by the incident. In some such embodiments, the computer-executable instructions, when executed by the at least one processor, cause the apparatus to report the error by causing the apparatus to cause presentation, by a user device, of the incident, wherein the presentation includes a reason code associated with the incident, a summary of the incident, and information regarding how to recover from the incident, and await instructions, from the user device, to initiate a failure recovery service to recover from the incident. Additionally or alternatively, the incident may further identify a correlation identifier that can be used to stitch together events in the system, and wherein the incident context identifies. at least one of a source unit of work, a target unit of work, and an initiating system or user that initiated processing that caused the error.

In some embodiments, the computer-executable instructions, when executed by the at least one processor, cause the apparatus to recover from the error by causing the apparatus to retrieve one or more resolvers responsive to one or more reason codes identified by an incident associated with the error, execute the one or more resolvers to rehydrate a context of a particular working state of the task coordination state machine that was in effect prior to occurrence of the error, and transition the task coordination state machine to the particular working state.

In a third example embodiment, a computer program product is provided that comprises at least one non-transitory computer-readable storage medium for improving failure recovery in a distributed system during execution of a processing chain. The at least one non-transitory computer-readable storage medium storing computer-executable instructions that, when executed, cause an apparatus to implement a task coordination state machine corresponding to the processing chain, discovering, using the task coordination state machine, an error occurring during execution of the processing chain, report the error, and recover from the error.

In some embodiments, the task coordination state machine comprises a set of states, wherein the set of states includes the error state and a state corresponding to each unit of work in the processing chain, a set of state transitions, each of which illustrates a logical connections between two states in the set of states, and a set of events defining changes in a context of the processing chain that correspond to each state transition.

In some embodiments, the computer-executable instructions, when executed, cause the apparatus to discover the error using the task coordination state machine by causing the apparatus to, in response to occurrence of the error, transition the task coordination state machine from a particular working state into an error state, and generate a notification based on the error. In some such embodiments, the notification identifies a reason code, a time stamp, a type of the error, a severity of the error, and a criticality of the error.

In some embodiments, the computer-executable instructions, when executed, cause the apparatus to report the error by causing the apparatus to generate an incident based on a notification generated during discovery of the error, wherein the generated incident identifies an incident context and one or more reason codes describing one or more failures that caused the error, store the incident in an incident repository, and notify applications affected by the incident. In some such embodiments, the computer-executable instructions, when executed, cause the apparatus to report the error by causing the apparatus to cause presentation, by a user device, of the incident, wherein the presentation includes a reason code associated with the incident, a summary of the incident, and information regarding how to recover from the incident, and await instructions, from the user device, to initiate a failure recovery service to recover from the incident. Additionally or alternatively, the incident may further identify a correlation identifier that can be used to stitch together events in the system, and wherein the incident context identifies. at least one of a source unit of work, a target unit of work, and an initiating system or user that initiated processing that caused the error.

In some embodiments, the computer-executable instructions, when executed, cause the apparatus to recover from the error by causing the apparatus to retrieve one or more resolvers responsive to one or more reason codes identified by an incident associated with the error, execute the one or more resolvers to rehydrate a context of a particular working state of the task coordination state machine that was in effect prior to occurrence of the error, and transition the task coordination state machine to the particular working state.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings, which are not necessarily drawn to scale.

DETAILED DESCRIPTION

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention.

Overview

Figure 1A:
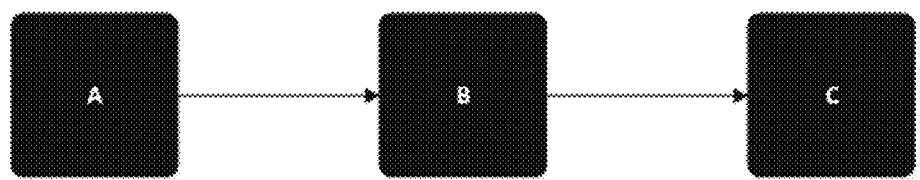
FIGS. 1A-1C illustrate a series of diagrams illustrating failure recovery in traditional distributed systems.
Figure 1B:
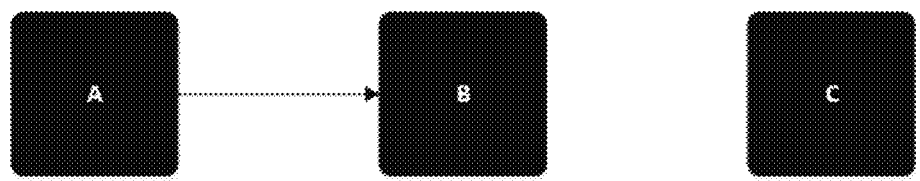
Figure 1C:
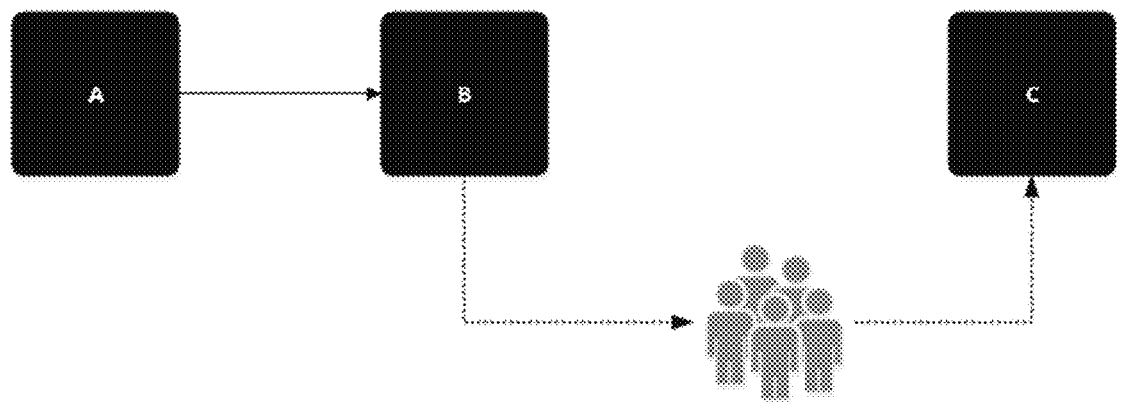

As mentioned previously in connection with FIG. 1C, traditional methods for recovering from failures in a distributed system are extremely error prone, and rely heavily on the effort of a set of individuals working in unison upstream to deploy and verify each fix with customers. Largely, this is a result of the fact that traditional distributed systems do not employ the concept of task coordination.

Example embodiments described herein implement task coordination within the distributed system by binding various units of work together with a state machine. While the units of work do not directly interact with one another, the use of a state machine to bind the units of work together ensures that the processing chain itself is stateful and enables the processing chain to effectively recover from failures.

Figure 2A:
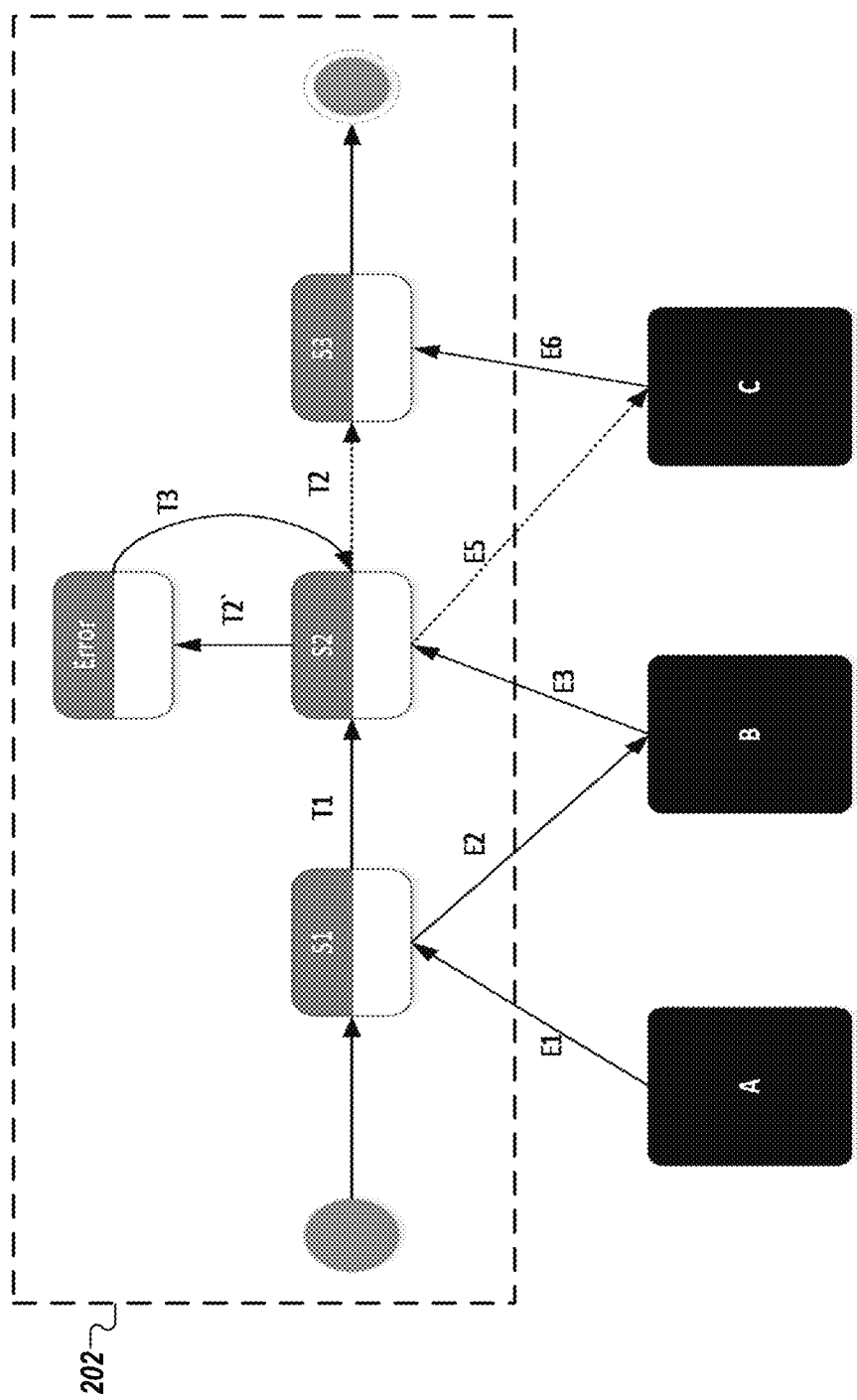
FIG. 2A illustrates a schematic diagram representing an example processing chain implementation utilizing a state machine, in accordance with some example embodiments described herein.

FIG. 2A illustrates a model for implementing failure recovery, in accordance with some example embodiments described herein. As shown in FIG. 2A, this model adds a state machine 202 that binds together the units of work A, B, and C in the processing chain. Each unit of work in the processing chain is represented by a corresponding state (in this example, one of states S1, S2, S3, or Error), a state transition (in this example, one of transitions T1, T2, T2', or T3), and an event (in this example, one of events E1, E2, E3, E5, or E6). The individual units of work A, B, and C shown in FIG. 2A do not themselves store the context describing how to work with each other. Instead, the state machine is responsible for documenting this context. Keeping track of the state of the system in this fashion therefore establishes a fundamental capability of the model illustrated in FIG. 2A that is not present in the model shown in FIGS. 1A-1C: the model shown in FIG. 2A is stateful.

Making a processing chain stateful introduces the ability to utilize an error state. In FIG. 2A, when an error occurs at event E5 (as with the examples shown in FIGS. 1A-1C, FIG.

2A shows an error occurring between units of work B and C), the state machine 202 of FIG. 2A will transition to the error state, which serves as a logical stopping point whereby processing can continue at a later time during the recovery phase. When this happens, a failure recovery system will record what is called an "incident." As used herein, the term "incident" refers to a failure report that provides an encapsulation of the system failure and contains information that can be later used to track and recover from the failure. An important element of an incident will be referred to herein as an incident "context." As used herein, the term "context" refers to a collection of data that plays a major role in both the discovery and recovery phases of the failure recovery system. The context identifies a source endpoint (e.g., the unit of work preceding the point in processing of the failure) and a target endpoint (e.g., the unit of work following the point in processing of the failure). The context further may identify a system or user that initiated the failed processing. It should be understood that in order for that incident to be effectively utilized, there has to be a way to link all the information and auditing together to provide a holistic view of what went on during processing that lead up to the incident and also the chain of events that occurred during recovery. Each incident therefore includes a correlation identifier, which is used to link all of the subsequent tracking events off of the incident. The correlation identifier is also used by the failure recovery system to identify which incidents need to be processed for a particular recovery transaction. In this regard, it can be said that the correlation identifier is ultimately used as a means to pull the incident context from the incident repository. Given a context and a correlation identifier, the incident can be used to stitch together events in the system during tracking, and any other information needed to reconstruct the original event that caused the failure. An incident thus provides the system with enough information that the system can recover.

It should be understood that there is no concept of a general context. Instead, a context is specific to each particular failure and system component that failed. For instance, in the example shown in FIG. 2A, the context found in state S1 would be different than that found in state S2, because each state would require different information to rehydrate the context change represented by the events (E2 and E5, respectively) that lead to the next state. Rehydration of these events thus represents a recovery of the system and enables transition of the system to the next state. During recovery, the context is used to rehydrate the event (e.g., E5 in FIG. 2A) responsible for ultimately transitioning to the next unit of work. In the example shown in FIG. 2A, the context for state S2 can thus be used to rehydrate event E5 to advance from unit B to unit C in the processing chain without having to restart the processing chain from scratch or attempt to divine the context manually.

Figure 2B:
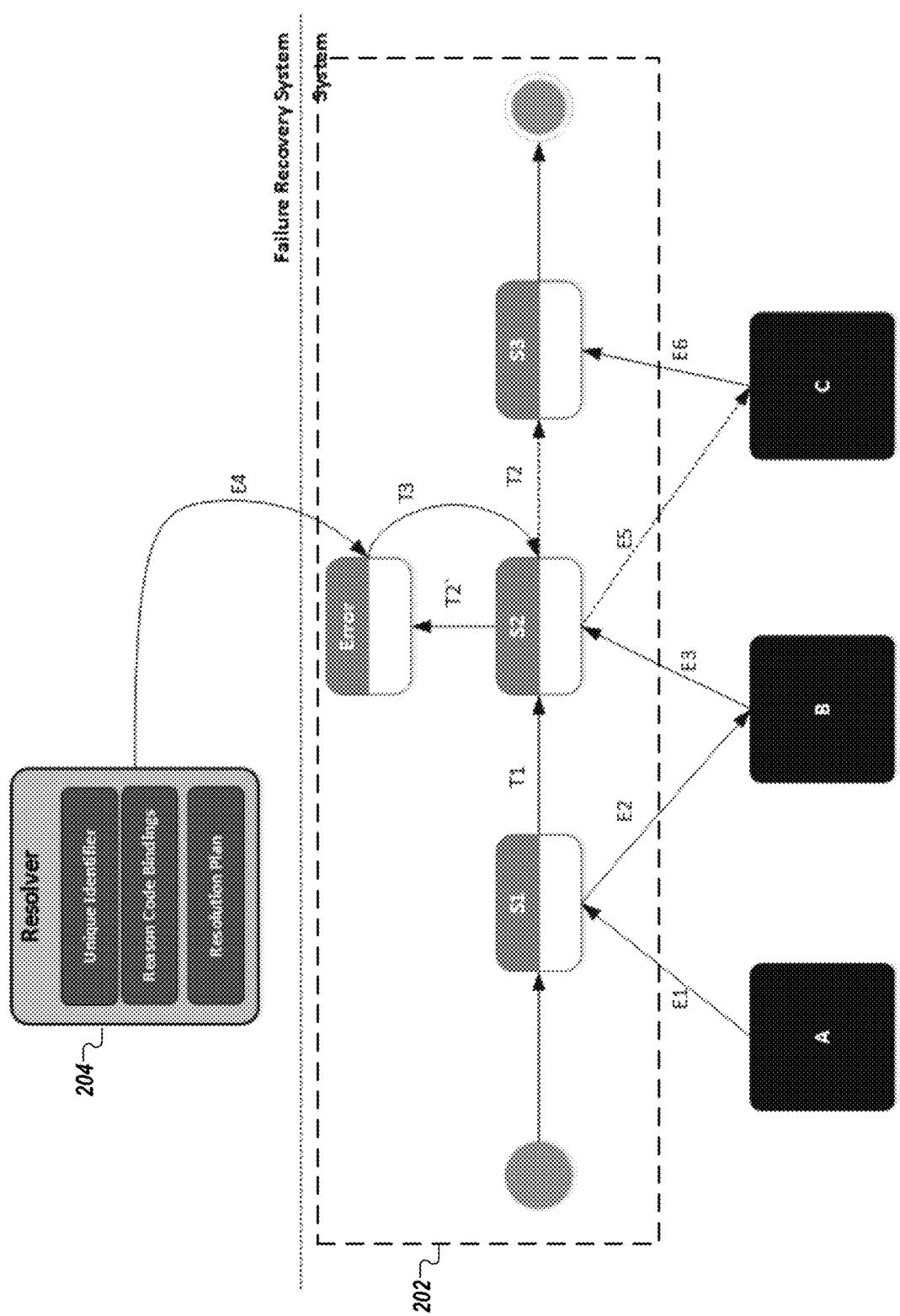
FIG. 2B illustrates a more detailed schematic block diagram of an example processing chain implementation that depicts how a distributed system may utilize a resolver to recover from a failure, in accordance with some example embodiments described herein.

As implemented in example embodiments described herein, the human element on the system side can additionally be replaced by a mechanism to automate the recovery from failure. In this regard, attention will be turned now FIG. 2B, which provides a schematic block diagram showing how a distributed system can utilize a resolver 204 to facilitate recovery from a failure in accordance with some example embodiments described herein. Applying the resolver concept (which is discussed in greater detail in accordance with FIGS. 3A-3C) to the model shown in FIG. 2A, the model shown in FIG. 2B illustrates the delegation of the job of instructing the system on how to recover from the error to resolver 204, which is shown in FIG. 2B as part of a failure recovery system that may be distinct from the system implementing the processing chain and corresponding state machine. It will be noted that it remains the responsibility of humans to define what points in the system are recoverable and how to recover from failure at those points. However, after the resolver 204 has been registered with the failure recovery system, humans are no longer needed in the recovery process for that particular failure scenario, except in the optional situation where it is desirable for a user to manually initiate the recovery operation.

A necessary precursor to recovery from failures in the manner described above in connection with FIGS. 2A and 2B is the discovery of failures in the first place. As noted previously, the failure recovery system may detect the occurrence of an error in a data source somewhere and log an incident. One missing link in traditional systems is a robust mechanism for how these errors are bubbled up to the user. However, as contemplated herein, when user interaction is warranted, example embodiments described herein may provide additional functionality. For instance, error codes may be correlated with all processing events so that IT users can see the entire processing chain. In addition, error codes may be correlated to knowledgebase articles that describe what is required to resolve the problem. This can provide users with a holistic understanding of the nature and importance of an error. Finally, users may be provided with a single-click recovery button to recover from all types of recoverable errors.

Figure 3A:
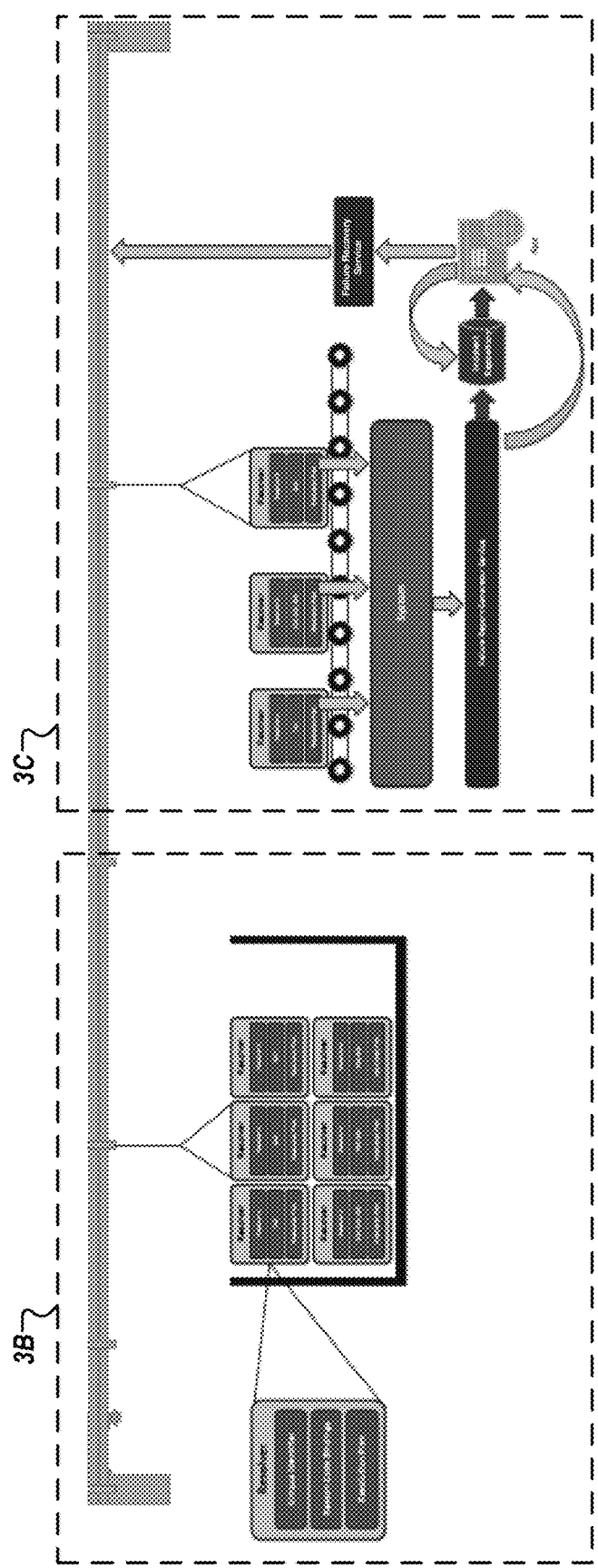
FIG. 3A illustrates a high-level system diagram for implementing some example embodiments described herein.
Figure 3B:
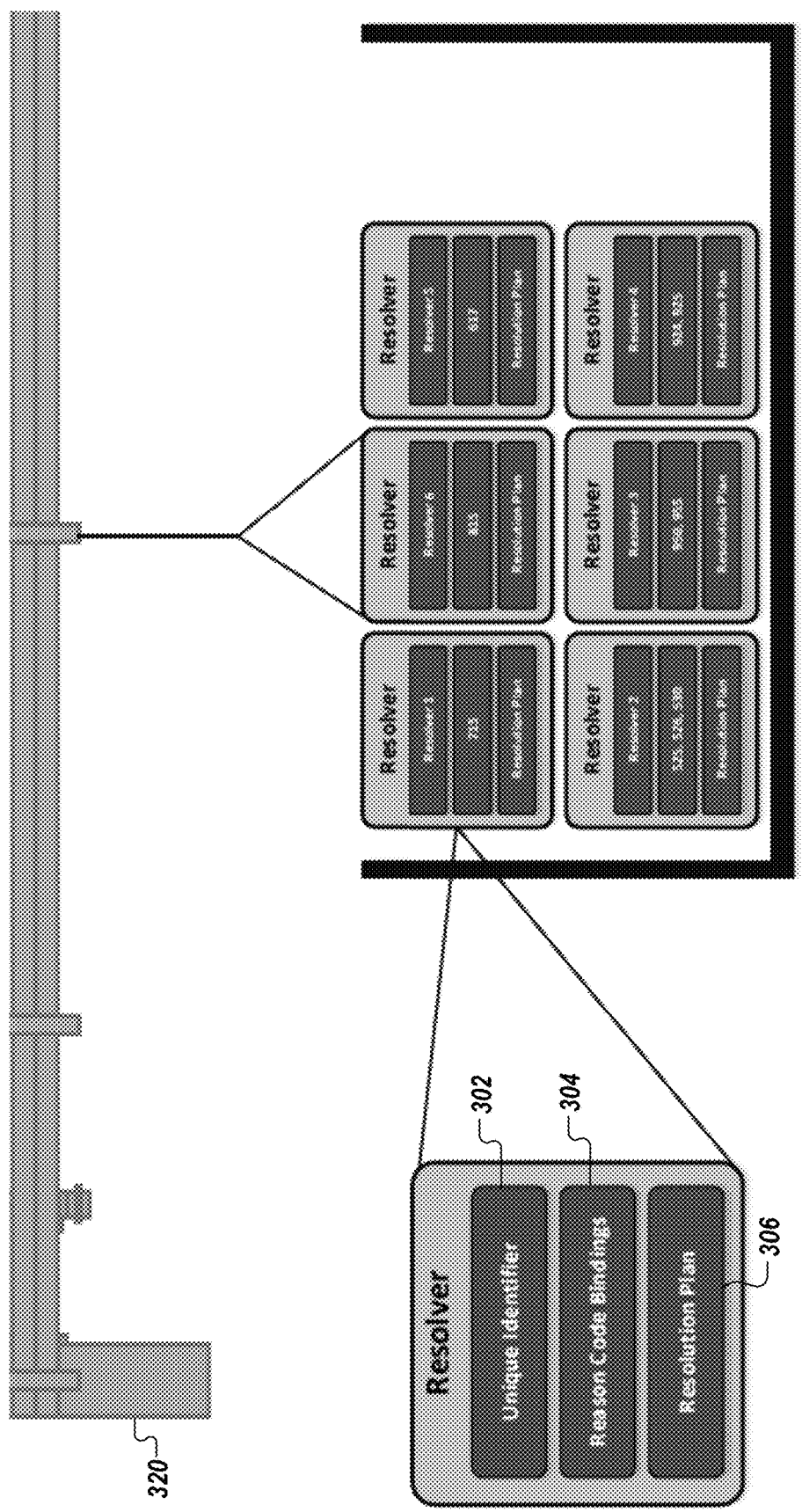
FIG. 3B illustrates a partial view of the high-level system diagram of FIG. 3A.
Figure 3C:
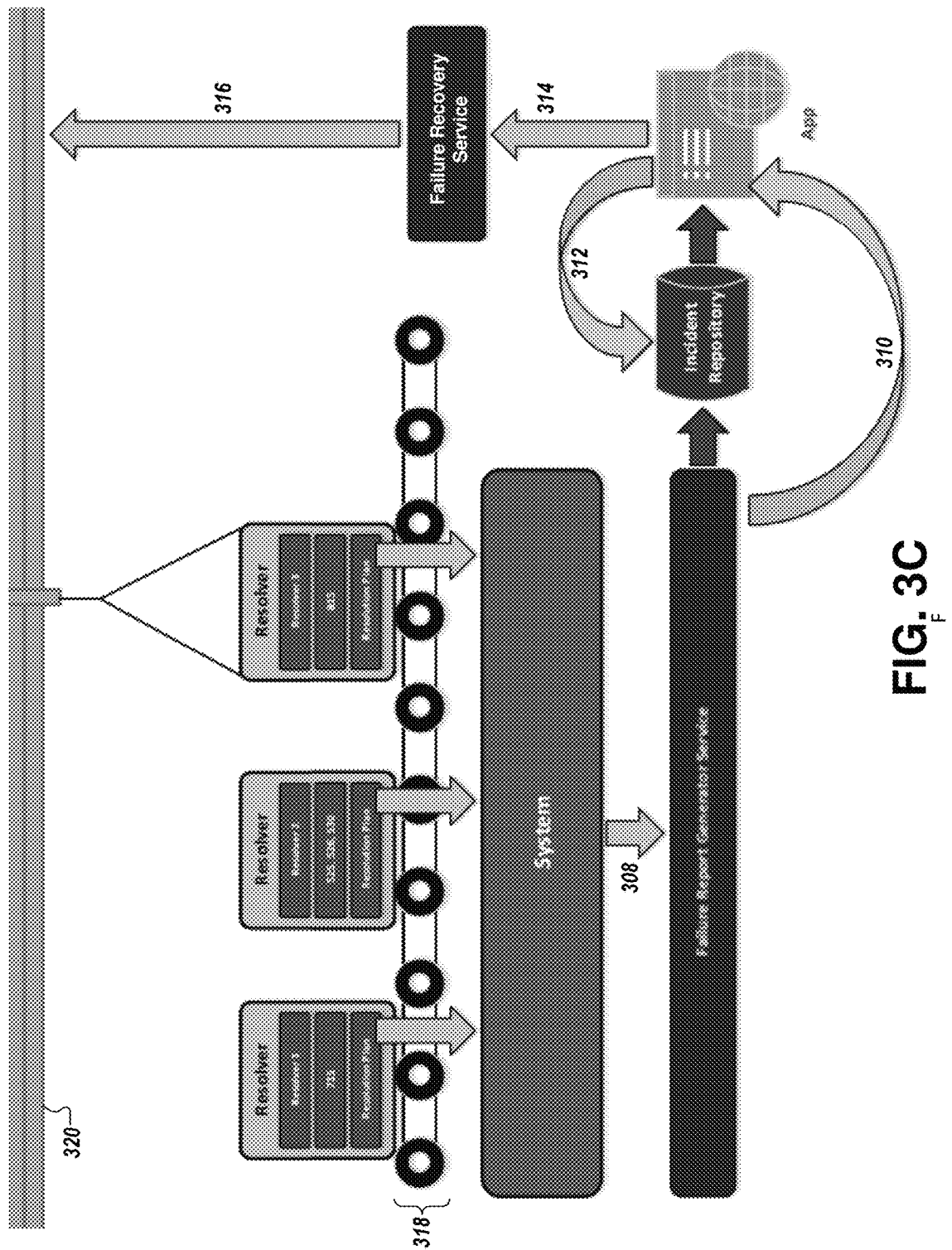
FIG. 3C illustrates another partial view of the high-level system diagram of FIG. 3A.

Turning now to FIGS. 3A-3C, some example embodiments will be described for discovering failures and recovering from them using one or more resolvers. FIG. 3A illustrates a high-level system diagram in this regard, while FIGS. 3B and 3C illustrate partial views of the high-level system diagram in greater detail.

Turning first to FIG. 3B, the components of a resolver are described in greater detail. Each resolver includes at least three components: (1) a unique identifier 302 that can be used to select the resolver during a recovery phase; (2) reason code bindings 304; and (3) a resolution plan 306. The resolution plan 306 comprises a series of instructions that, when executed, utilize the context of the incident to rehydrate the event that caused the failure. The reason code bindings 304 bind the resolution instructions for the particular resolver to one or more potential incidents. Finally, the unique identifier 302 may be utilized to uniquely identify each resolver and avoid execution of any single resolver more than once. FIG. 3B illustrates six different resolvers, but it will be understood that there may be any number of resolvers utilized by a failure recovery system.

Turning to FIG. 3C, a sequence of events is shown for discovering failures and recovering from them.

First, as shown by operation 308, the system may put itself into a failed state, aggregate all subsequent notifications, and then send a request to a failure report generator service. In this regard, it should be understood that a "notification," as referenced here, may contain data indicating a reason code (e.g., a numerical number and description representing the context of the notification), a time stamp defining when the notification was created, a type defining which entity initiated the notification (e.g., the system or a user), a severity defining whether the notification is an error, a warning, or simply informational in nature, and a criticality, which defines the level of intensity of the notification (e.g., low, medium, high, critical, or the like). In turn, the failure report generator service can identify notifications that self-identify as errors, and generate a corresponding incident. The corresponding incident may in turn be correlated to the source by way of a correlation ID and a reason code.

It should be noted that notifications may be generated throughout execution of the processing chain. Moreover, it is worth pointing out that notifications may be captured within a single processing unit. For example, if you were to open up a unit of work B, and look at the processing that takes place, it might look include sub-units of work X, Y, and Z. If execution of sub-unit X results in a warning, and both Y and Z result in failure, then unit of work B would aggregate these three notifications as an array of notification (e.g., [warning, error, error]). The failure report generator service is only interested in errors so it would filter out the warning—although the warning would appear in a historical tracking of the processing events that unit B broadcasts.

Notification generation can illustrated in connection with a concrete example in which a healthcare order is being processed and the system is trying to validate the order in terms of the particular tests to be performed on a patient. During processing, the order is sliced up into its subsequent tests, which then are processed independently. The purpose of this processing is to determine whether or not each test is ready to be transmitted to the lab where said tests are to be performed on the patient. In this scenario, the system performs map and replace tasks to ensure that the lab can identify both the tests and the ordering provider who made the request so that he/she would subsequently be notified of the results from said tests. It is possible that the ordering provider does not have a mapping in the system and there is no appropriate catalog identifier for the ordered tests from the lab's perspective. In such a case, the system would tally the notifications in memory and broadcast a failure report only when the system can proceed no further in the processing chain, at which time this information is subsequently persisted for historical tracking and one or more incidents are generated by the failure report generator service. In this scenario, there would be exactly two incidents generated, representing the fact that the system failed processing of the test in multiple ways that would therefore need to be corrected in multiple ways (from within multiple applications as well). It is also worth noting that notifications are generated throughout the system for tracking purposes in the form of warnings and informational details, but that these notifications only have a role in failure recovery when they represent error scenarios.

At operation 310, the failure report generator service may thereafter notify applications that are interested in the correlation ID, which in turn will be able to recover from the failed state in the system. Once notified, at operation 312 each application may retrieve all the associated incidents given a particular correlation ID from an incident repository, and may in some embodiments display them to the user for resolution. When providing such a display, the presentation may include a reason code, a summary of the issue, and detailed information on how to resolve the issue (e.g., a knowledgebase article).

As shown at operation 314, when a "Recovery" button is clicked by the user, the application will send a request to a failure recovery service with information pertinent to build a resolution plan such as the list of incidents, the person who is initiating recovery, and the correlation ID. The user might in turn need to go to another application to make the necessary changes for successful recovery. It should be appreciated that in some embodiments (e.g., where user action is unlikely to affect incident resolution) the system may automatically send the request to the failure recovery service, thus requiring no user intervention.

As shown at operation 316, the failure recovery service may then call a resolution plan selector 320, passing it the list of incidents, for selection of the corresponding resolver for each reason code. Because a resolution plan can be bound to multiple reason codes—the caveat being that a single reason code cannot belong to multiple resolution plans—and because an incident has a one-to-one relationship with a reason code, the resolution plan selector thereafter is able to determine whether or not a resolver that is bound to the reason code(s) has already been selected in the scenario when the system has recorded several incidents during processing. So, plans that have already been selected are marked according to the responsive resolver's unique identifier, thereby ensuring that they will not be executed more than once.

As shown at operation 318, a resolution plan executor cycles through the list of resolvers, calling their corresponding resolution plan in a sequential chain without regard for order, with the caveat being that the application and/or system for which recovery is to be initiated must have either prior knowledge of, or be smart enough to discover, where to record incidents and how to respond to recovery requests. Each resolver then addresses its corresponding failures, and the system should continue processing as if it never failed from this point forward, with the caveat being that this process may result in different and/or the same incidents being recorded along the processing chain.

Accordingly, by implementing task coordination with a state machine, example embodiments disclosed herein create a stateful implementation of a processing chain that allows the retrieval of the context of the processing chain at a failure point, which in turn enables the processing chain to more effectively recover from failures by rehydrating relevant data fields, rather than retrying entire units of work. Furthermore, by utilizing automatic resolvers to direct this rehydration, reliance on human effort can be diminished, thus improving consistency and reducing the potential for human error. Example methods and apparatuses that implement these concepts are described in greater detail below.

System Architecture

Methods, apparatuses, and computer program products of the present invention may be embodied by any of a variety of devices. Example embodiments may include a plurality of networked devices operating in a distributed system. In this regard, it will be understood that the term "distributed system" refers to a plurality of networked devices in which some components are shared among the devices. In an example distributed system, user interface processing may be performed by end-user terminals, while business processing may be performed by back-end servers, and database access may be facilitated by still other devices or sets of devices. Example distributed systems may utilize any of a variety of fixed terminals, such as desktop computers, mainframe devices, kiosks, or the like. Similarly, example distributed systems may also utilize any of a variety of mobile terminals, such as a portable digital assistant (PDA), mobile telephone, smartphone, laptop computer, tablet computer, or any combination of the aforementioned devices.

Figure 4:
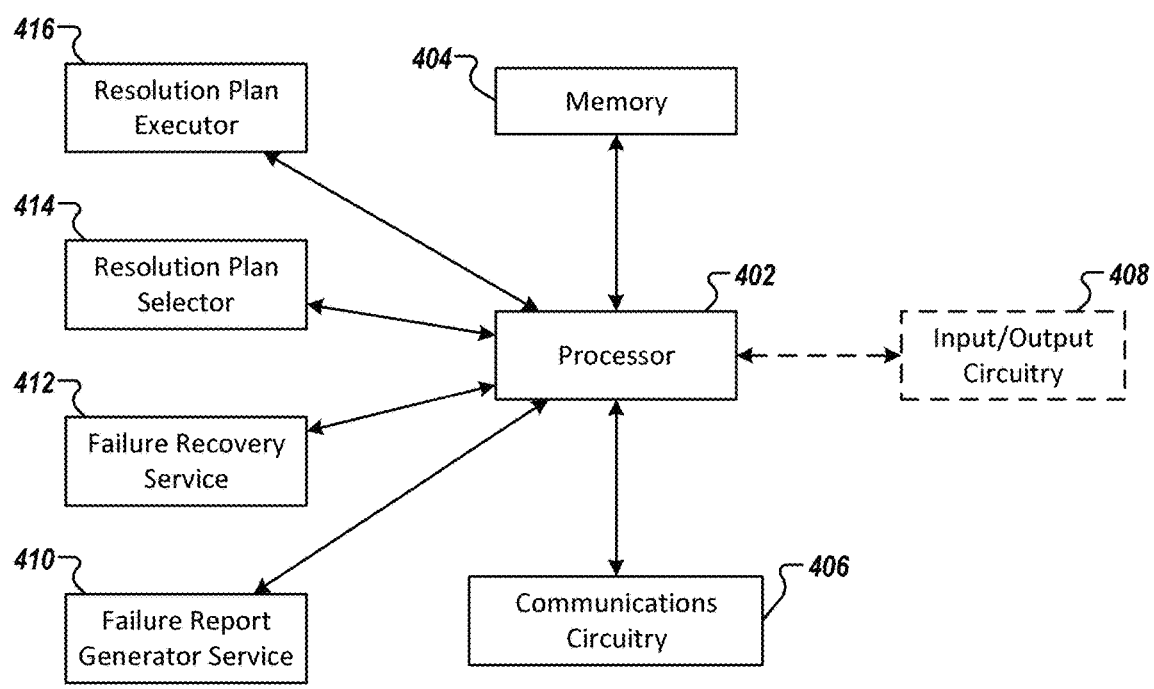
FIG. 4 illustrates a schematic block diagram of example circuitry embodying a networked device that may perform operations in accordance with some example embodiments described herein.

Turning to FIG. 4, an example apparatus 400 is illustrated that may represent a basic set of components of a given networked device that may perform operations described herein to implement the failure recovery system described herein. The apparatus 400 may include a processor 402, a memory 404, and communications circuitry 406. Some of the networked devices may further include input/output circuitry 408 for interacting with a user, a failure report generator service 410, a failure recovery service 412, a resolution plan selector 414, and a resolution plan executor 416. The apparatus 400 may be configured to execute the operations described below in connection with FIGS. 11-13. Although these components 402-416 are described with some functional descriptors, it should be understood that the particular implementations necessarily include the use of particular hardware. It should also be understood that certain of these components 402-414 may include similar or common hardware. For example, the failure report generator service 410 may leverage use of the processor 402, memory 404, or communications circuitry 406, to perform its associated functions, and duplicate hardware is not required for the distinct components of the apparatus 400 (although embodiments using duplicated hardware are also contemplated herein). The use of the term "circuitry" as used herein with respect to components of the apparatus therefore includes particular hardware configured to perform the functions associated with the particular circuitry described herein. Of course, while the term "circuitry" should be understood broadly to include hardware, in some embodiments, circuitry may also include software for configuring the hardware components of the apparatus 400.

In some embodiments, the processor 402 (and/or co-processor or any other processing circuitry assisting or otherwise associated with the processor) may be in communication with the memory 404 via a bus for passing information among components of the apparatus. The processor 402 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 402 may be configured to execute instructions stored in the memory 404 or otherwise accessible to the processor. Alternatively or additionally, the processor may be configured to execute hard-coded functionality. As such, whether configured by hardware or software methods, or by a combination of hardware with software, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the memory 404 may be non-transitory and may include, for example, one or more volatile and/or non-volatile memories. In other words, for example, the memory may be an electronic storage device (e.g., a computer readable storage medium). The memory 404 may be configured to store information, data, content, applications, instructions, or the like, for enabling the apparatus to carry out various functions in accordance with example embodiments contemplated herein.

The communications circuitry 406 may be any means such as a device or circuitry embodied in either hardware or a combination of hardware and software that is configured to receive and/or transmit data from/to a network and/or any other device, circuitry, or module in communication with the apparatus 400. In this regard, the communications circuitry 406 may include, for example, a network interface for enabling communications with a wired or wireless communication network. For example, the communications circuitry 406 may include one or more network interface cards, antennae, buses, switches, routers, modems, and supporting hardware and/or software, or any other device suitable for enabling communications via a network. Additionally or alternatively, the communication interface 406 may include the circuitry for interacting with the antenna(s) to cause transmission of signals via the antenna(s) or to handle receipt of signals received via the antenna(s). These signals may be transmitted by the apparatus 400 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

In some embodiments, the apparatus 400 may include input/output circuitry 408 that may, in turn, be in communication with processor 402 to provide output to a user and, in some embodiments, to receive an indication of user input. The input/output circuitry 408 may comprise a user interface and may include a display that may include a web user interface, a mobile application, a client device, or the like. In some embodiments, the input/output circuitry 408 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor 402 (e.g., memory 404, and/or the like).

In addition, the apparatus 400 may also comprise failure report generator service 410, which includes executable code run as an operating system service that listens for pertinent events to start execution, whereas the other components in the system operate within the context of said services. Failure report generator service 410 necessarily includes hardware components designed to run this executable code, and, when executing, is configured to retrieve error notifications and generate corresponding incidents. Failure report generator service 410 may utilize processor 402, memory 404, communications circuitry 406, or any other hardware component included in the apparatus 400 to retrieve these error notifications and/or generate the corresponding incidents.

In addition, the apparatus 400 may also comprise failure recovery service 412, which includes hardware components designed to build a resolution plan for each incident generated by the failure report generator service 410 to return parts of the system that are stuck in error states back into normal working states. Failure recovery service 412 may utilize processor 402, memory 404, or any other hardware component included in the apparatus 400 to build these resolution plans. Failure recovery service 412 may further utilize communications circuitry 406 to communicate with various devices within the distributed system, such as a user-facing terminal or a fault recovery system.

In addition, the apparatus 400 may also comprise resolution plan selector 414, which includes hardware components designed to receive incidents from the failure recovery service 412 and select corresponding resolvers. In this regard, while resolution plan selector 414 may be a component of apparatus 400 in many embodiments, in some embodiments it is conceivable that resolution plan selector 414 is hosted by a separate apparatus and merely called-upon by the apparatus 400. Resolution plan selector 414 may utilize processor 402, memory 404, communications circuitry 406, or any other hardware component included in the apparatus 400 to select these corresponding resolvers.

Finally, the apparatus 400 may also comprise resolution plan executor 416, which includes hardware components designed to cycle through the selected resolvers and initiate their corresponding resolution plans. Resolution plan executor 416 may utilize processor 402, memory 404, communications circuitry 406, or any other hardware component included in the apparatus 400 to initiate these resolution plans.

Failure report generator service 410, failure recovery service 412, resolution plan selector 414, and resolution plan executor 416 may utilize processing circuitry, such as the processor 402, to facilitate performance of their respective operations, and may utilize memory 404 to store state computer instructions that, when executed, cause performance of those operations and/or store information retrieved in response to performance of those operations. It should be appreciated that, in some embodiments, failure report generator service 410, failure recovery service 412, resolution plan selector 414, and resolution plan executor 416 may each include a separate processor, specially configured field programmable gate array (FPGA), or application specific interface circuit (ASIC) to perform their corresponding functions. Failure report generator service 410, failure recovery service 412, resolution plan selector 414, and resolution plan executor 416 are therefore implemented using hardware components of the apparatus configured by either hardware or software for implementing these planned functions.

As described above and as will be appreciated based on this disclosure, example embodiments may be implemented by a distributed system having a plurality of networked devices, such as fixed devices, mobile devices, backend network devices, and/or the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

It should be appreciated, with respect to certain networked devices embodied by apparatus 400 as described in FIG. 4, computer program instructions and/or other type of code may be loaded onto a computer, processor or other programmable apparatus's circuitry to produce a machine, such that the computer, processor other programmable circuitry that execute the code on the machine create the means for implementing various functions described herein.

Having described specific components of an example networked device (e.g., apparatus 400) that may be utilized in a distributed system to improve the ability of the distributed system to discover failures and recover from them, example embodiments of the present invention are described below in connection with a series of flowcharts.

Use Case Illustrating Operation of One Example Embodiment

Turning now to FIGS. 5A-10B, one particular use case is described that illustrates how an implementation of an example embodiment of the present invention may operate. This example may occur in the context of a distributed system comprising an order processing system operating in the healthcare arena, and in particular, one that facilitates the ordering of lab tests from a lab.

Figure 5A:
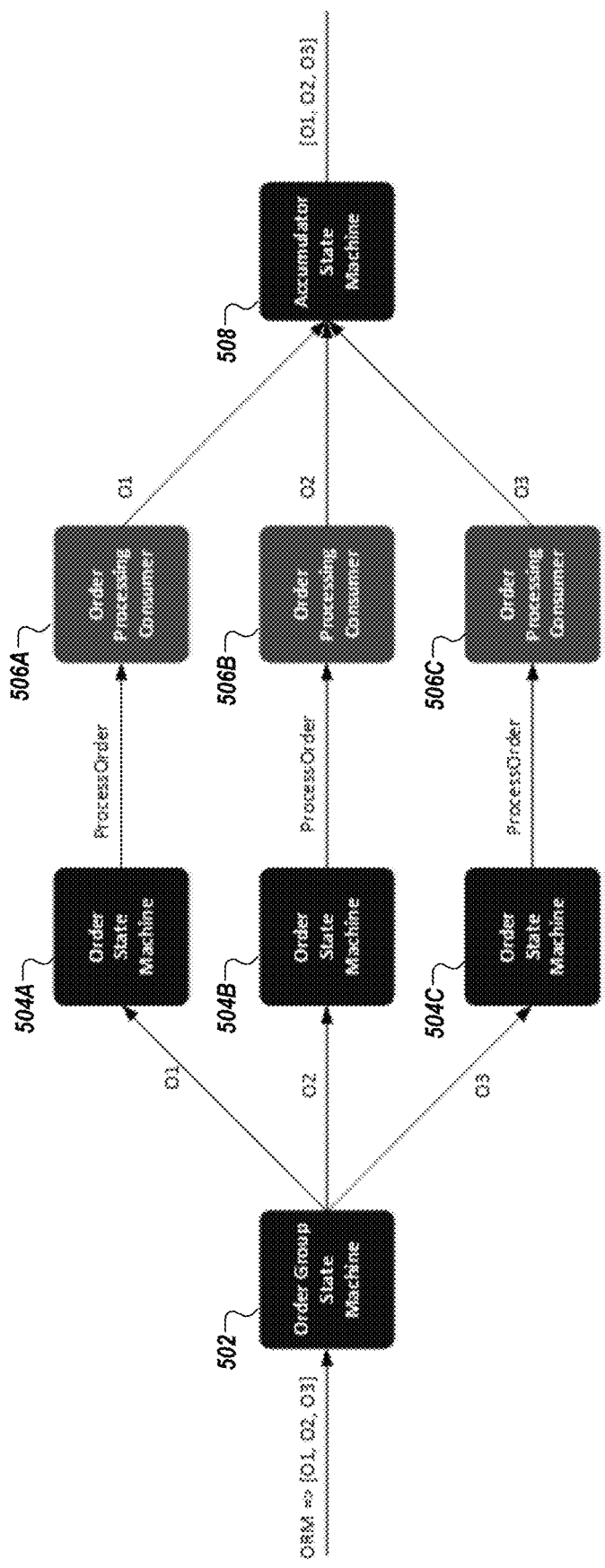
FIGS. 5A and 5B illustrate a particular example processing chain associated with receipt of three orders for tests to be performed at a particular lab, in accordance with some example embodiments described herein.
Figure 5B:
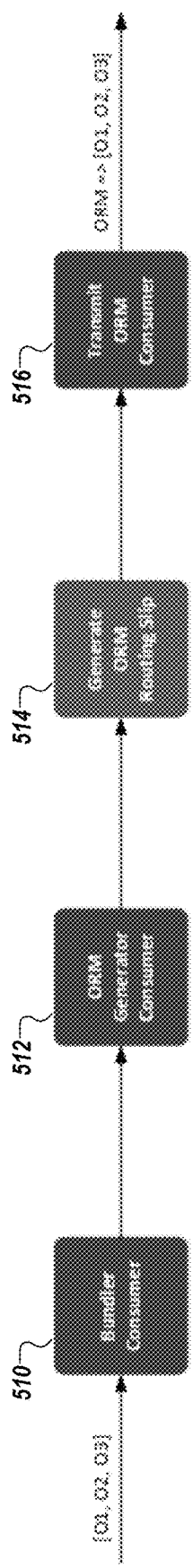

As shown in FIG. 5A, an order (ORM) may be placed with the system requesting performance of three tests (O1, O2, and O3) by way of a single ORM message (for instance, it may be the case that the settings for the lab at which the order is to be fulfilled may mandate that only a maximum of 3 orders per ORM message can be sent to that lab). As shown by operation 502, the system may identify that three tests have been ordered, and then, in operations 504A-504C and 506A-506C, the processing chain may process each of the three tests separately. Subsequently, the separate results may be accumulated in operation 508, and as shown in FIG. 5B, these results are bundled together in operation 510, an ORM message to the consumer is created at 512, a routing slip is appended in operation 514, and the ORM message is delivered back to the consumer in operation 516. Accordingly, it should be evident from this processing flow that a single ORM message can have one or more associated tests.

Figure 6:
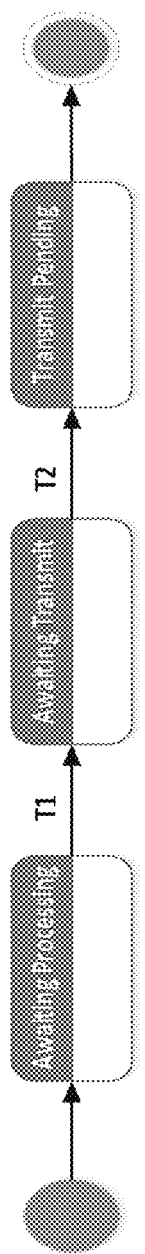
FIG. 6 illustrates an order state machine, in accordance with an example use case described in connection with FIGS. 5A and 5B.

A corresponding order state machine may be represented by the model shown in FIG. 6.

Figure 7A:
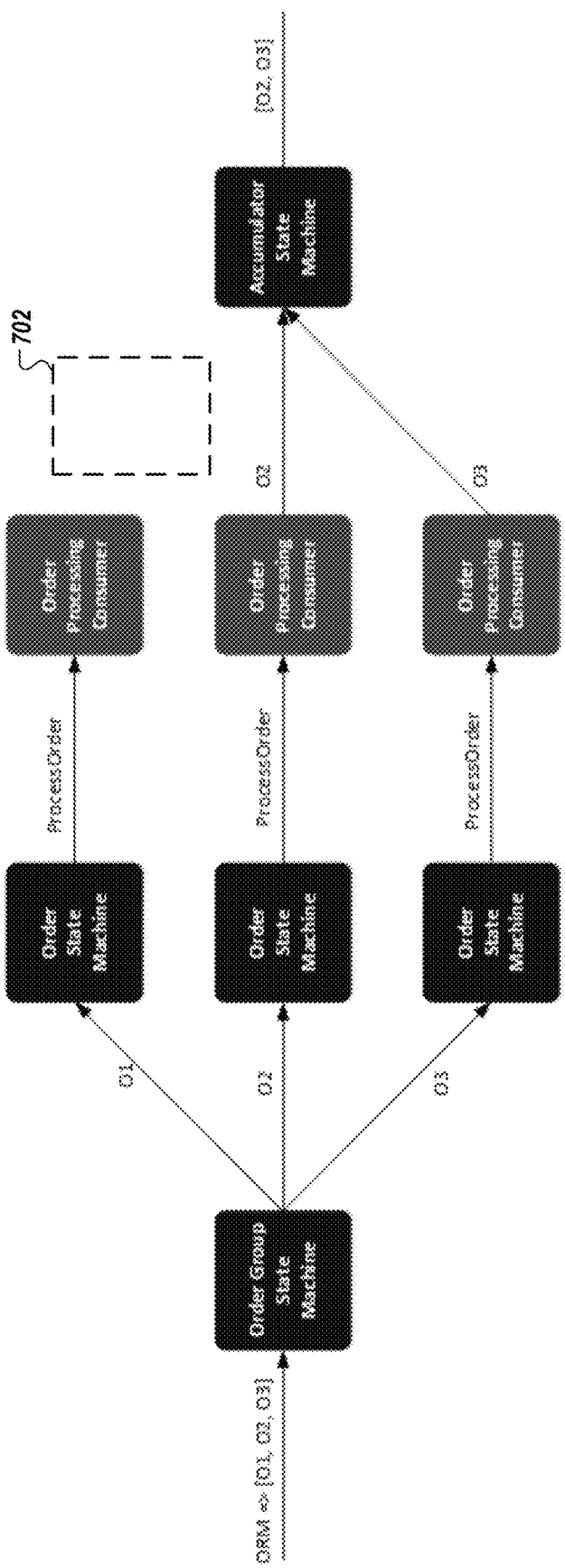
FIGS. 7A and 7B illustrate a processing chain associated with failure to complete a particular test O1, in a variant of the example embodiment described in connection with FIGS. 5A and 5B.
Figure 7B:
Figure 8:
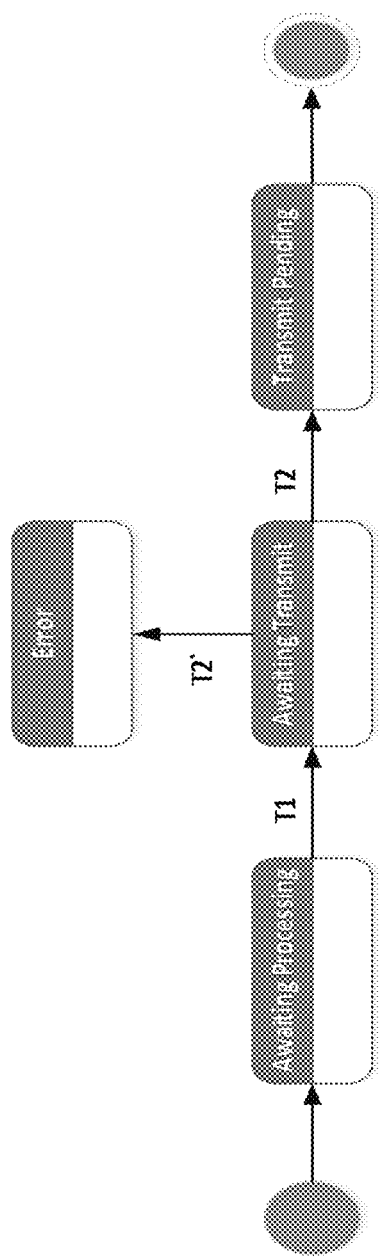
FIG. 8 illustrates an order state machine including an error state, in accordance with an example use case described in connection with FIGS. 7A and 7B.

While FIGS. 5A and 5B illustrate an example where processing does not fail, consider the situation that occurs when test O1 fails while executing in its corresponding Orders State Machine. Assume, for now, that this failure occurred because the system could not find the ordering provider (which may, for instance, comprise reason code 645) and because there was no mapping to test O1 in the lab's catalog (which may comprise reason code 657). As shown in FIGS. 7A and 7B, in this situation test O1 would never make it to the Accumulator State Machine for processing (as shown by empty box 702), and instead test O1 will be put into an error state in its corresponding Order State Machine (as shown in FIG. 8). In the meantime, tests O2 and O3 would be processed, and in this example a corresponding ORM message would be sent to the consumer regarding those two tests alone.

Figure 9:
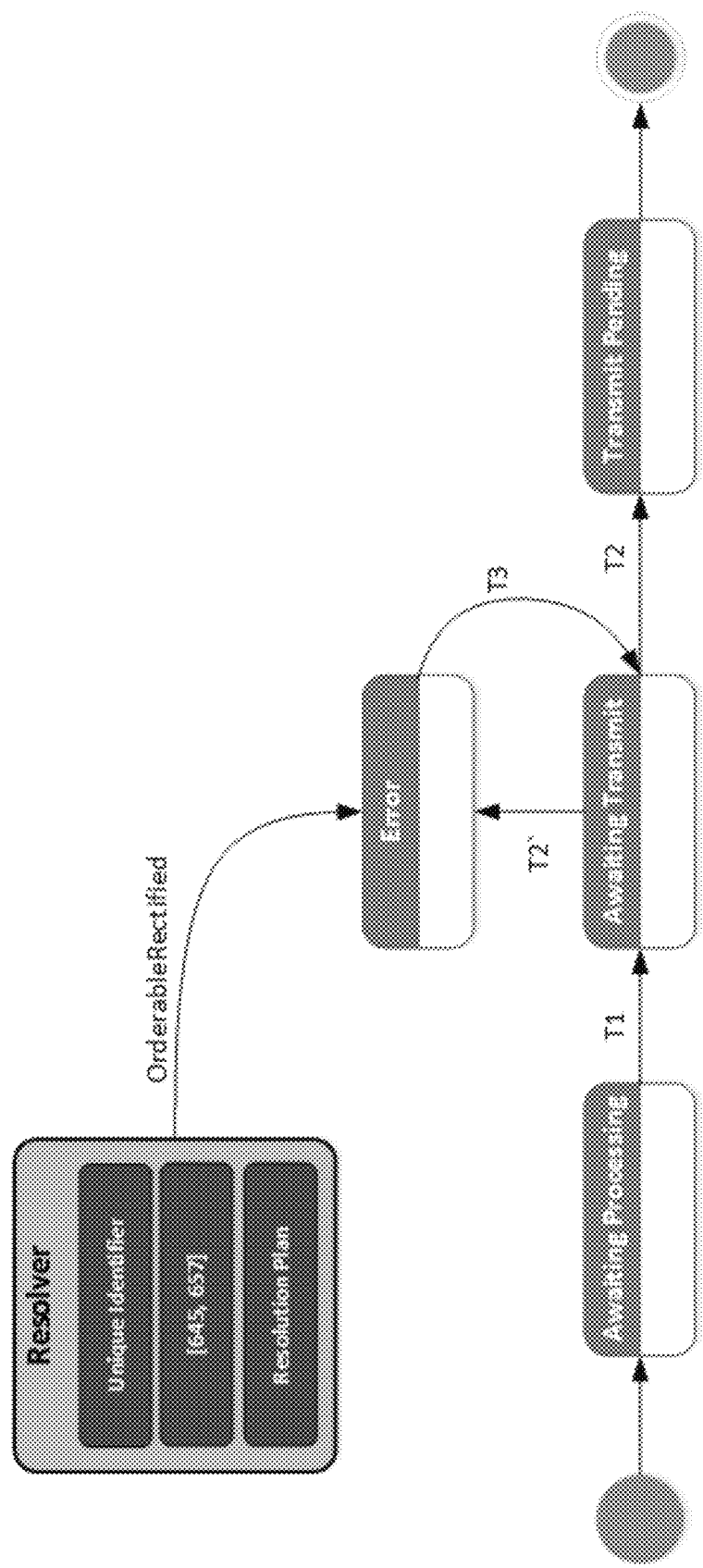
FIG. 9 depicts how a distributed system may utilize a resolver to recover from the failure of test O1 in the example described in connection with FIGS. 7A and 7B.

In relation to the failure of test O1, the user would be able to see both reason codes 645 and 657 in a user interface (UI) as both error codes would be recorded at different points in the processing pipeline, yet correlated to a single identifier. In this example, time is not a factor here, and O1 will sit in the error state until recovery is initiated. When recovery is initiated (as shown in FIG. 9), an appropriate resolver would then be selected. When the resolver's resolution plan is executed, it would send a command (e.g., OrderableRectified) to the system (Orders State Machine) that is in a state of error, which would then have enough information to ultimately rehydrate the command (i.e. ProcessOrder) that is needed to process test O1. This event is later observed by the Order Processing Consumer as if it was initiated as part of normal processing. Since both reason codes 645 and 657 are in this example bound to the same resolver, the resolver would only be selected once. Otherwise, the system would send out an additional ORM.

Figure 10A:
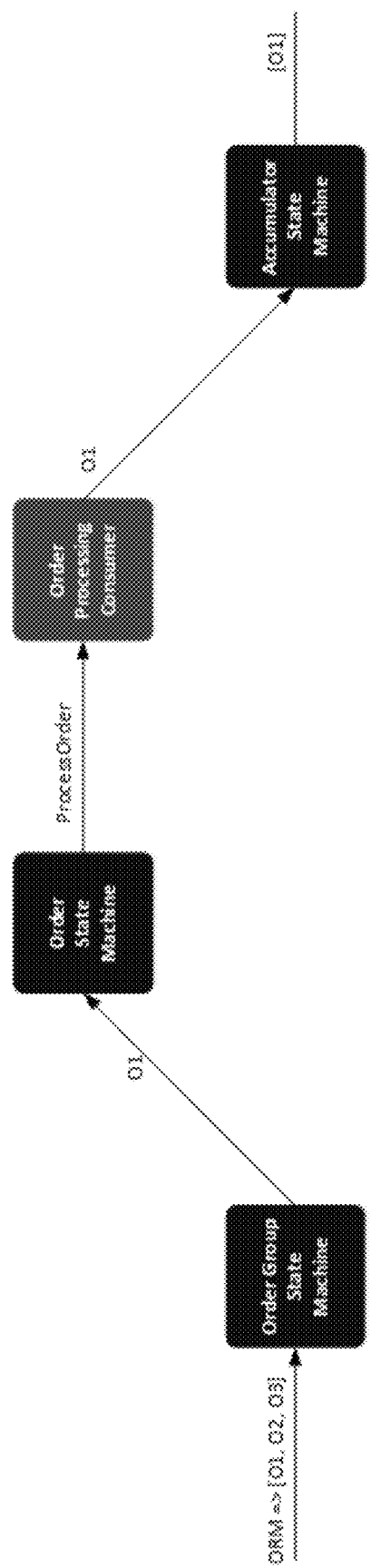
FIGS. 10A and 10B illustrate a processing chain associated with recovery from failure of test O1, in a variant of the example embodiment described in connection with FIGS. 5A and 5B.
Figure 10B:
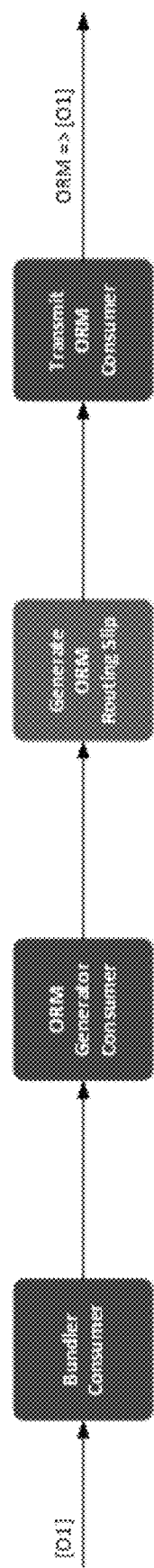

So, once the resolution command (i.e. OrderableRectified) has been sent, the state machine will observe this command and return to its normal state of Awaiting Transmit as it would have if no error ever happened. In this regard, resolution would have the effect of sending test O1 out on a new ORM (as shown in FIGS. 10A and 10B) since the Accumulator would not have held back the other ordered tests just because test O1 was in a failed state.

Operations for Improving Resilience of a Distributed System

Figure 11:
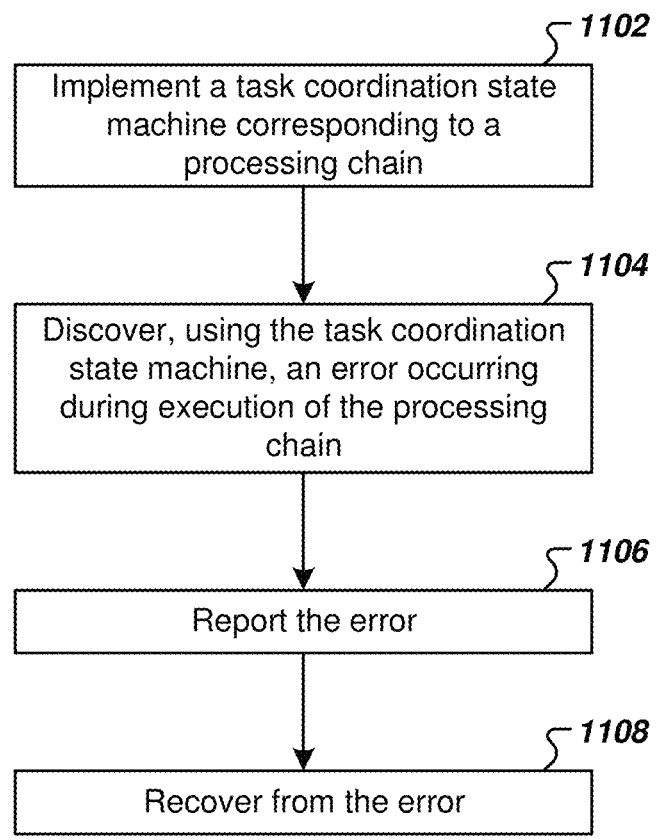
FIG. 11 illustrates a flowchart describing example operations performed for improving failure recovery in a distributed system during execution of a processing chain, in accordance with some example embodiments described herein.
Figure 12:
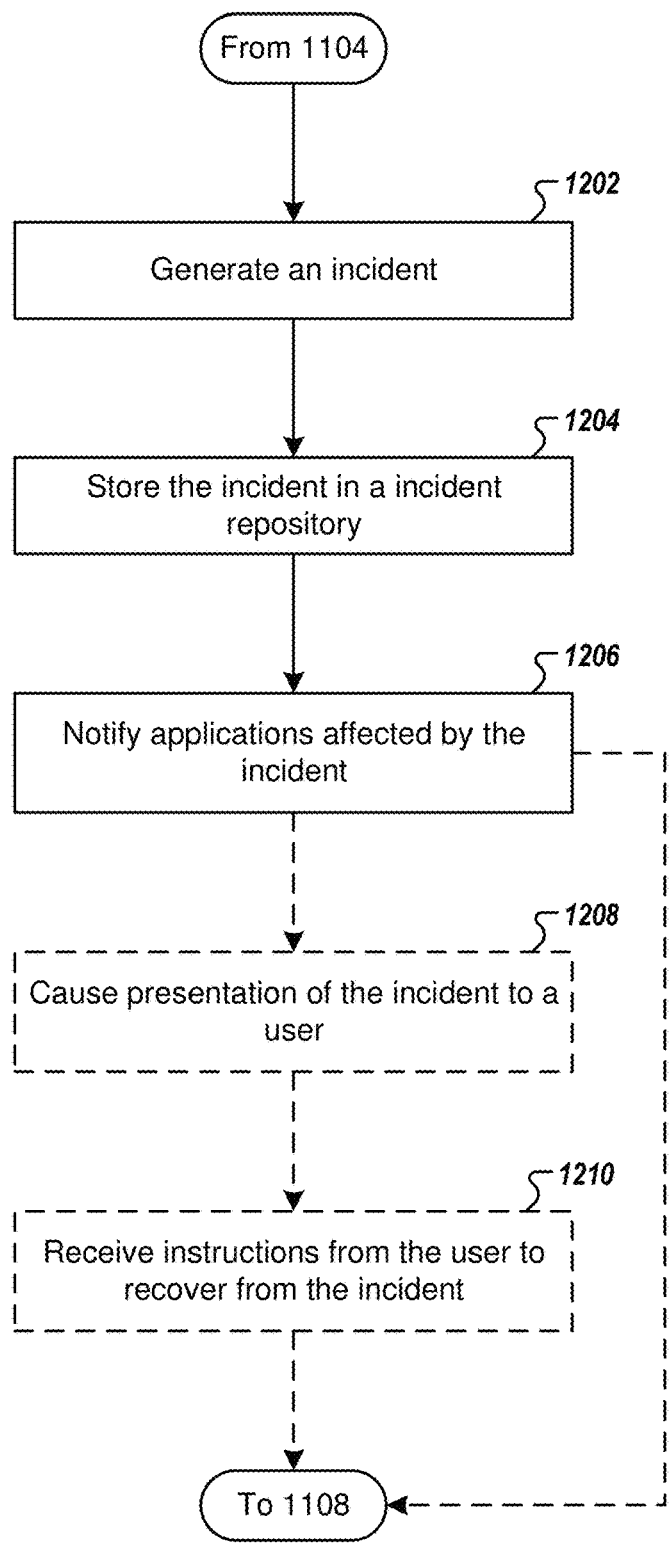
FIG. 12 illustrates a flowchart describing example operations for reporting errors occurring during execution of a processing chain, in accordance with some example embodiments described herein.
Figure 13:
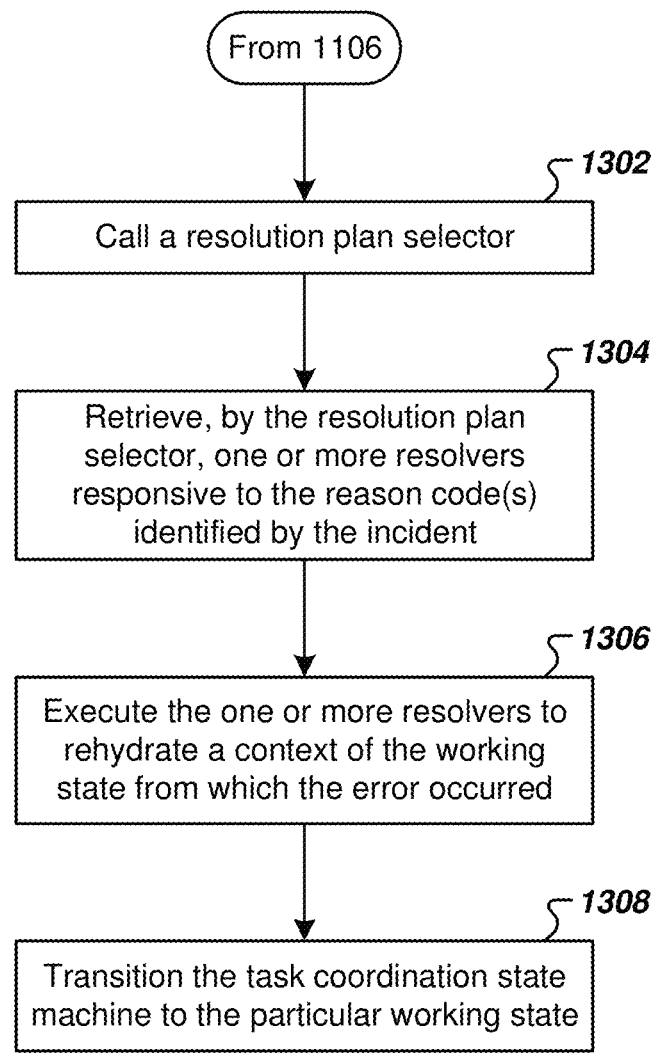
FIG. 13 illustrates a flowchart describing example operations performed for recovering from an error, in accordance with some example embodiments described herein.

Turning now to FIGS. 11-13, flowcharts are illustrated that contain operations performed by a networked device to discover failures and recover from them. The operations illustrated in FIGS. 11-13 may, for example, be performed by, with the assistance of, and/or under the control of an apparatus 400 embodying a networked device within a distributed system, and more particularly through the use of one or more of processor 402, memory 404, communications circuitry 406, input/output circuitry 408, failure report generator service 410, failure recovery service 412, resolution plan selector 414, and resolution plan executor 416.

Turning first to FIG. 11, example operations are provided for improving failure recovery in a distributed system during execution of a processing chain.

In operation 1102 the apparatus 400 includes means, such as processor 402 or the like, for implementing, by the distributed system, a task coordination state machine corresponding to the processing chain. In some embodiments, this task coordination state machine may include a set of states, wherein the set of states includes the error state and a state corresponding to each unit of work in the processing chain. The task coordination state machine may further include a set of state transitions, each of which illustrates a logical connections between two states in the set of states, and a set of events defining changes in a context of the processing chain that correspond to each state transition.

In operation 1104 the apparatus 400 includes means, such as processor 402, memory 404, communications circuitry 406, input/output circuitry 408, or the like, for discovering, using the task coordination state machine, an error occurring during execution of the processing chain. In some embodiments, discovering the error using the task coordination state machine includes, in response to occurrence of the error, transitioning the task coordination state machine from a particular working state into an error state, and generating a notification based on the error. Moreover, as described in greater detail above, the notification itself may identify a reason code, a time stamp, a type of the error, a severity of the error, and a criticality of the error.

In operation 1106 the apparatus 400 includes means, such as failure report generator service 410, failure recovery service 412, or the like, for reporting the error. Example operations performed to report an error are described in greater detail below in connection with FIG. 12.

In operation 1108 the apparatus 400 includes means, such as failure recovery service 412 or the like, for recovering from the error. Example operations performed during incident recovery are described in greater detail above in connection with FIGS. 3A-3C and below in connection with FIG. 13.

Turning next to FIG. 12, example operations are described for reporting errors occurring during execution of a processing chain. As indicated above, the operations described below may correspond to operation 1106 discussed above in connection with FIG. 11. Accordingly, the procedure shown in FIG. 11 may transition from operation 1104 to operation 1202 of FIG. 12.

In operation 1202, the apparatus 400 includes means, such as failure report generator service 410 or the like, for generating an incident based on a notification generated during discovery of the error. In this regard, the generated incident may identify an incident context and one or more reason codes describing one or more failures that caused the error. Moreover, in some embodiments the incident further identifies a correlation identifier that can be used to stitch together events in the system, and wherein the incident context identifies at least one of a source unit of work, a target unit of work, and an initiating system or user that initiated processing that caused the error.

In operation 1204, the apparatus 400 includes means, such as memory 404, failure report generator service 410, or the like, for storing the incident in an incident repository.

In operation 1206, the apparatus 400 includes means, such as processor 402, failure report generator service 410, or the like, for notifying applications affected by the incident. This operation may in some embodiments correspond to operations 310 and 312, which are described above in connection with FIG. 3C.

From operation 1206, the procedure may follow one of two paths. In some embodiments, incidents may be presented for user inspection and action, and in such embodiments, the procedure advances to optional operations 1208 and 1210, described below. Alternatively, however, some incidents may not benefit from user inspection or action, and in those embodiments, the procedure instead may return to operation 1108 to initiate recovery from the incident.

In optional operation 1208, the apparatus 400 includes means, such as communications circuitry 406, input/output circuitry 408, or the like, for causing presentation, by a user device, of the incident. In some embodiments, this presentation includes a reason code associated with the incident, a summary of the incident, and information regarding how to recover from the incident.

In optional operation 1210, the apparatus 400 includes means, such as communications circuitry 406, input/output circuitry 408, or the like, for receiving, from the user device, an instruction to initiate a failure recovery service to recover from the incident. This operation in some embodiments may correspond to operation 314, which is described above in connection with FIG. 3C. Following receipt of the instruction to initiate the failure recovery service, the procedure may return to operation 1108 to initiate recovery from the incident.

Turning next to FIG. 13, example operations are disclosed for recovering from an error. As indicated above, the operations described below may correspond to operation 1108, discussed above in connection with FIG. 11. Accordingly, the procedure shown in FIG. 11 may transition from operation 1106 to operation 1302 of FIG. 13.

In operation 1302, the apparatus 400 includes means, such as failure recovery service 412 or the like, for calling a resolution plan selector 414 that will select one or more resolvers to recover from the incident. This operation in some embodiments may correspond to operation 316, which is described above in connection with FIG. 3C.

In operation 1304, the apparatus 400 includes means, such as resolution plan selector 414 or the like, for retrieving one or more resolvers responsive to one or more reason codes identified by the incident. In the example representation shown in FIGS. 3A-3C, this operation may be performed by resolution plan selector 320, which for ease of explanation, is illustrated as a crane that "carries" particular resolvers from a failure recovery system for execution by the distributed system to recover from failures.

In operation 1306, the apparatus 400 includes means, such as resolution plan executor 416 or the like, for executing the one or more resolvers to rehydrate a context of a particular working state of the task coordination state machine that was in effect prior to occurrence of the error. In the example representation shown in FIG. 2B, this operation may correspond to performance of event E4.

Finally, in operation 1308, the apparatus 400 includes means, such as processor 402 or the like, for transitioning the task coordination state machine to the particular working state. In the example representations shown in FIGS. 2A, 2B, this operation may correspond to transition T3.

As described above, example embodiments described herein improve the ability of a distributed system to discover failures and recover from them. To do so, example embodiments described herein implement task coordination within the distributed system by binding various units of work together with a state machine. While the units of work do not directly interact with one another, the use of a state machine to bind the units of work together ensures that the processing chain itself is stateful and enables the processing chain to effectively recover from failures. By automating these processes and rigorously utilizing predefined resolvers, example embodiments described herein are better able to meet statutory and regulatory requirements regarding data integrity such as those imposed by HIPAA. Moreover, by utilizing resolvers that rigorously and completely recover from failures, example embodiments avoid the possibility of downstream issues caused by data not passing through normal processing points. Moreover, automating the failure discovery process provides the ability to deliver actionable information enabling the user to control when (or if) to recover from failures. Finally, automating failure recovery empowers users to recover from incidents unilaterally without the need to involve many other customer support or other representatives of the organization managing the distributed system.

FIGS. 11-13 illustrate flowcharts describing the operation of apparatuses, methods, and computer program products according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory of an apparatus 400 employing an embodiment of the present invention and executed by a processor of the apparatus 400. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware and computer instructions.

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for providing for failure recovery in a distributed system during execution of a processing chain, the method comprising:
    implementing, by the distributed system, a task coordination state machine corresponding to the processing chain, the task coordination state machine storing a set of states in memory;
    discovering, using the task coordination state machine, an error caused by an event occurring during execution of the processing chain;
    reporting the error by a failure report generator service; and
    recovering, by a failure recovery service, from the error by:
        calling, by the failure recovery service, a resolution plan selector for selection of one or more resolvers to recover from the error;
        retrieving, by the resolution plan selector, one or more resolvers responsive to one or more reason codes identified by an incident associated with the error;
        executing, by a resolution plan executor, the one or more resolvers to rehydrate one or more data fields in memory; and
        transitioning, by the distributed system, the task coordination state machine to a particular working state that was in effect prior to occurrence of the error, thereby rehydrating the event that caused the error.

2. The method of claim 1, wherein the task coordination state machine comprises:

the set of states, wherein the set of states includes the error state and a state corresponding to each unit of work in the processing chain;
a set of state transitions, each of which illustrates a logical connections between two states in the set of states; and
a set of events defining changes in a context of the processing chain that correspond to each state transition.

3. The method of claim 1, wherein discovering the error using the task coordination state machine includes:
in response to occurrence of the error,
transitioning the task coordination state machine from the particular working state into an error state, and generating a notification based on the error.

4. The method of claim 3, wherein the notification identifies a reason code, a time stamp, a type of the error, a severity of the error, and a criticality of the error.

5. The method of claim 1, wherein reporting the error by the failure report generator service includes:
generating an incident based on a notification generated during discovery of the error, wherein the generated incident identifies an incident context and one or more reason codes describing one or more failures that caused the error;
storing the incident in an incident repository; and
notifying applications affected by the incident.

6. The method of claim 5, wherein reporting the error by the failure report generator service further includes:
causing presentation, by a user device, of the incident, wherein the presentation includes a reason code associated with the incident, a summary of the incident, and information regarding how to recover from the incident; and
awaiting instructions, from the user device, to initiate a failure recovery service to recover from the incident.

7. The method of claim 5, wherein the incident further identifies a correlation identifier that can be used to stitch together events in the system, and wherein the incident context identifies at least one of a source unit of work, a target unit of work, and an initiating system or user that initiated processing that caused the error.

8. An apparatus for providing for failure recovery in a distributed system during execution of a processing chain, the apparatus comprising at least one processor and at least one memory storing computer-executable instructions, that, when executed by the at least one processor, cause the apparatus to:
implement a task coordination state machine corresponding to the processing chain, the task coordination state machine storing a set of states in memory;
discover, using the task coordination state machine, an error caused by an event occurring during execution of the processing chain;
report the error; and
recover from the error by:
retrieving one or more resolvers responsive to one or more reason codes identified by an incident associated with the error;
executing the one or more resolvers to rehydrate one or more data fields in memory; and
transitioning the task coordination state machine to a particular working state that was in effect prior to occurrence of the error, thereby rehydrating the event that caused the error.

9. The apparatus of claim 8, wherein the task coordination state machine comprises:

the set of states, wherein the set of states includes the error state and a state corresponding to each unit of work in the processing chain;
a set of state transitions, each of which illustrates a logical connections between two states in the set of states; and
a set of events defining changes in a context of the processing chain that correspond to each state transition.

10. The apparatus of claim 8, wherein the computer-executable instructions, when executed by the at least one processor, cause the apparatus to discover the error using the task coordination state machine by causing the apparatus to:
in response to occurrence of the error,
transition the task coordination state machine from the particular working state into an error state, and generate a notification based on the error.

11. The apparatus of claim 10, wherein the notification identifies a reason code, a time stamp, a type of the error, a severity of the error, and a criticality of the error.

12. The apparatus of claim 8, wherein the computer-executable instructions, when executed by the at least one processor, cause the apparatus to report the error by causing the apparatus to:
generate an incident based on a notification generated during discovery of the error, wherein the generated incident identifies an incident context and one or more reason codes describing one or more failures that caused the error;
store the incident in an incident repository; and
notify applications affected by the incident.

13. The apparatus of claim 12, wherein the computer-executable instructions, when executed by the at least one processor, cause the apparatus to report the error by causing the apparatus to:
cause presentation, by a user device, of the incident, wherein the presentation includes a reason code associated with the incident, a summary of the incident, and information regarding how to recover from the incident; and
await instructions, from the user device, to initiate a failure recovery service to recover from the incident.

14. The apparatus of claim 12, wherein the incident further identifies a correlation identifier that can be used to stitch together events in the system, and wherein the incident context identifies at least one of a source unit of work, a target unit of work, and an initiating system or user that initiated processing that caused the error.

15. A computer program product comprising at least one non-transitory computer-readable storage medium for providing for failure recovery in a distributed system during execution of a processing chain, the at least one non-transitory computer-readable storage medium storing computer-executable instructions that, when executed, cause an apparatus to:
implement a task coordination state machine corresponding to the processing chain;
discover, using the task coordination state machine, an error caused by an event occurring during execution of the processing chain, the task coordination state machine storing a set of states in memory;
report the error; and
recover from the error by:
calling a resolution plan selector for selection of one or more resolvers to recover from the error;
retrieving, by the resolution plan selector, one or more resolvers responsive to one or more reason codes identified by an incident associated with the error;

executing, by a resolution plan executor, the one or more resolvers to rehydrate one or more data fields in memory; and transitioning the task coordination state machine to a particular working state that was in effect prior to occurrence of the error, thereby rehydrating the event that caused the error.

16. The computer program product of claim 15, wherein the computer-executable instructions, when executed, cause the apparatus to report the error by causing the apparatus to:

generate an incident based on a notification generated during discovery of the error, wherein the generated incident identifies an incident context and one or more reason codes describing one or more failures that caused the error;

store the incident in an incident repository; and notify applications affected by the incident.

17. The computer program product of claim 16, wherein the computer-executable instructions, when executed, cause the apparatus to report the error by causing the apparatus to:

cause presentation, by a user device, of the incident, wherein the presentation includes a reason code associated with the incident, a summary of the incident, and information regarding how to recover from the incident; and await instructions, from the user device, to initiate a failure recovery service to recover from the incident.

18. The computer program product of claim 15, wherein the computer-executable instructions, when executed, cause the apparatus to recover from the error by causing the apparatus to:

retrieve one or more resolvers responsive to one or more reason codes identified by an incident associated with the error;

execute the one or more resolvers to rehydrate the event; and transition the task coordination state machine to the particular working state that was in effect prior to occurrence of the error.

19. A method for providing for failure recovery in a distributed system during execution of a processing chain, the method comprising:

implementing, by the distributed system, a task coordination state machine corresponding to the processing chain, the task coordination state machine storing a set of states in memory;

discovering, using the task coordination state machine, an error caused by an event occurring during execution of the processing chain;

generating an incident based on a notification generated during the discovery of the error, wherein the generated incident identifies an incident context and one or more reason codes describing one or more failures that caused the error;

storing the incident in an incident repository;

notifying applications affected by the incident;

reporting the error by a failure report generator service, wherein reporting the error comprises:

causing presentation, by a user device, of the incident, wherein the presentation includes a reason code associated with the incident, a summary of the incident, and information regarding how to recover from the incident; and awaiting instructions, from the user device, to initiate a failure recovery service to recover from the incident; and recovering, by a failure recovery service, from the error by rehydrating one or more data fields in memory to transition the task coordination state machine to a particular working state that was in effect prior to occurrence of the error, thereby rehydrating the event that caused the error.

20. The method of claim 19, wherein the incident further identifies a correlation identifier that can be used to stitch together events in the system, and wherein the incident context identifies at least one of a source unit of work, a target unit of work, or an initiating system or user that initiated processing that caused the error.

* * * * *